Oct. 21, 1947.  H. HÜRLIMANN  2,429,463
TRACTOR DRAWN PLOW
Filed Nov. 6, 1943  4 Sheets-Sheet 2

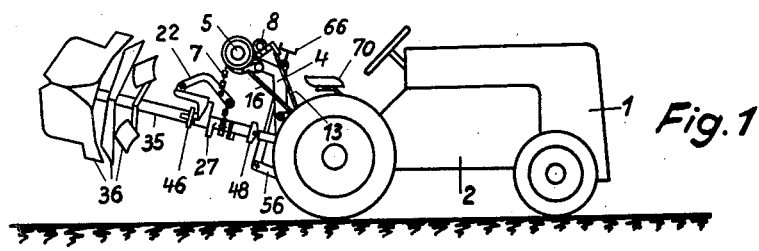
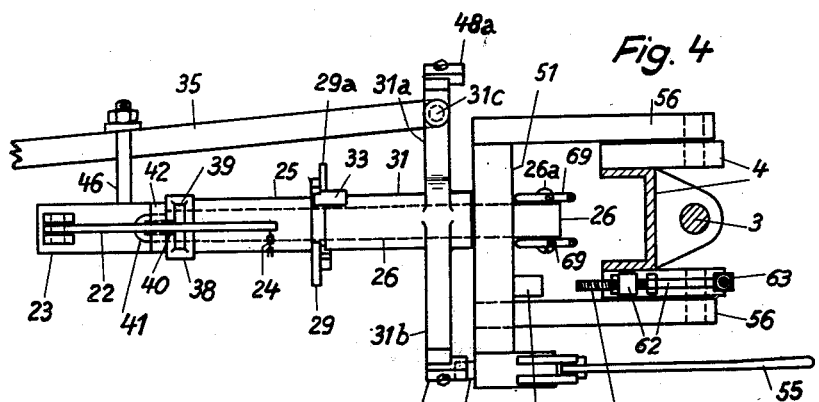
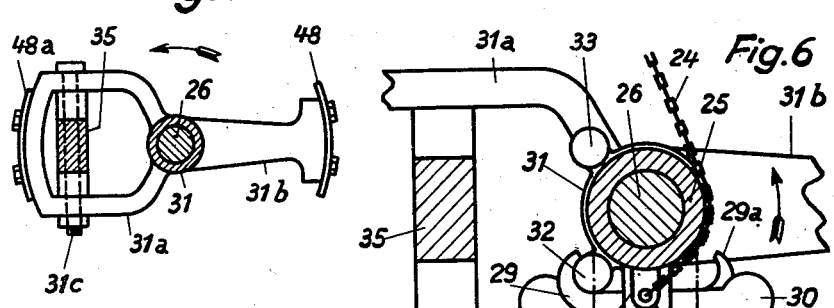
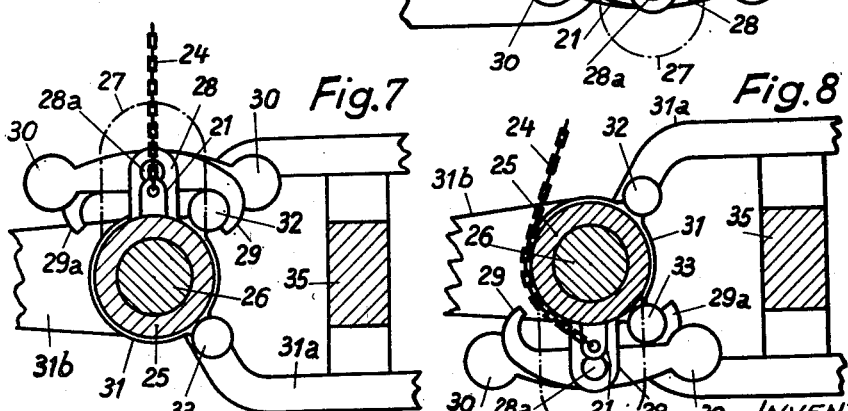

INVENTOR
Hans Hürlimann
by Hugh Ehlert Stern & Carlberg
ATTORNEYS

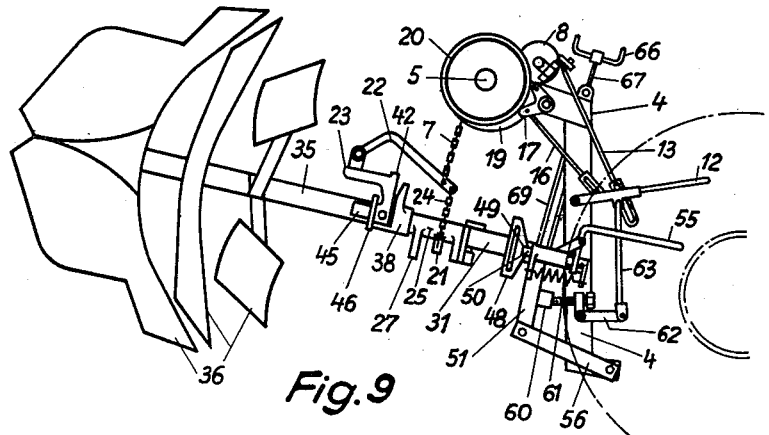
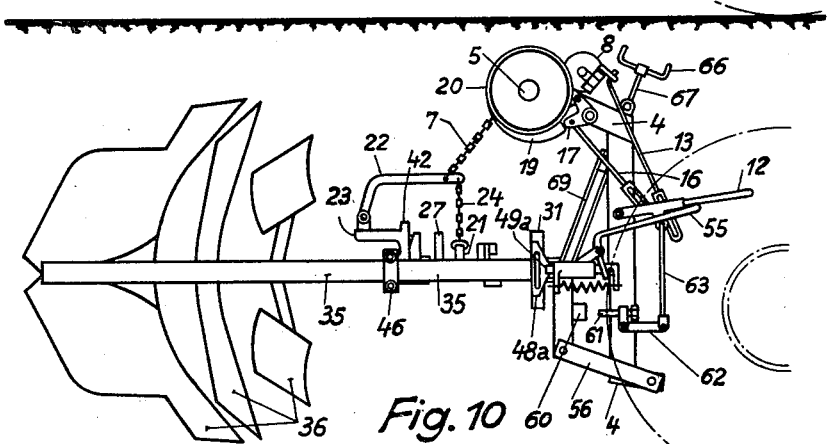
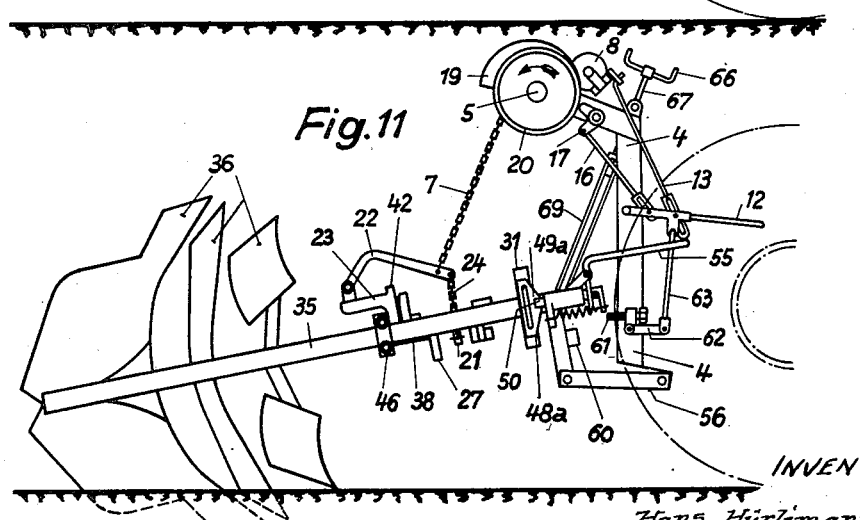

Oct. 21, 1947.  H. HÜRLIMANN  2,429,463
TRACTOR DRAWN PLOW
Filed Nov. 6, 1943  4 Sheets-Sheet 4
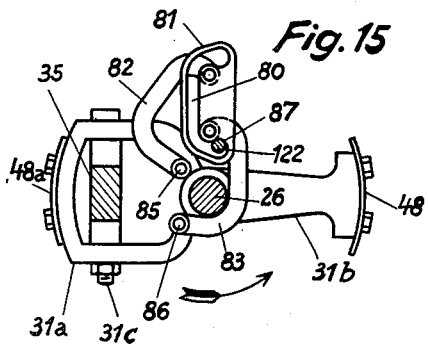
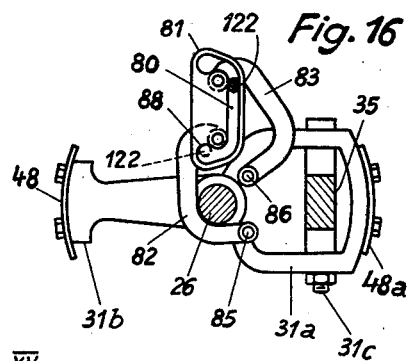
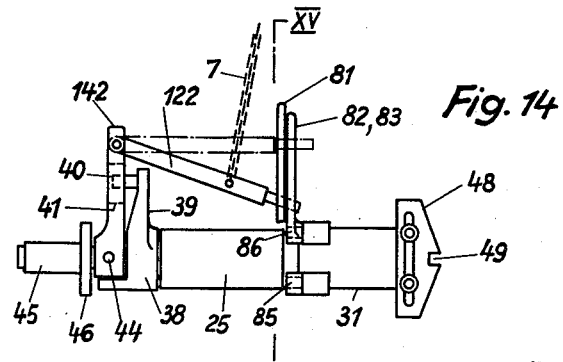
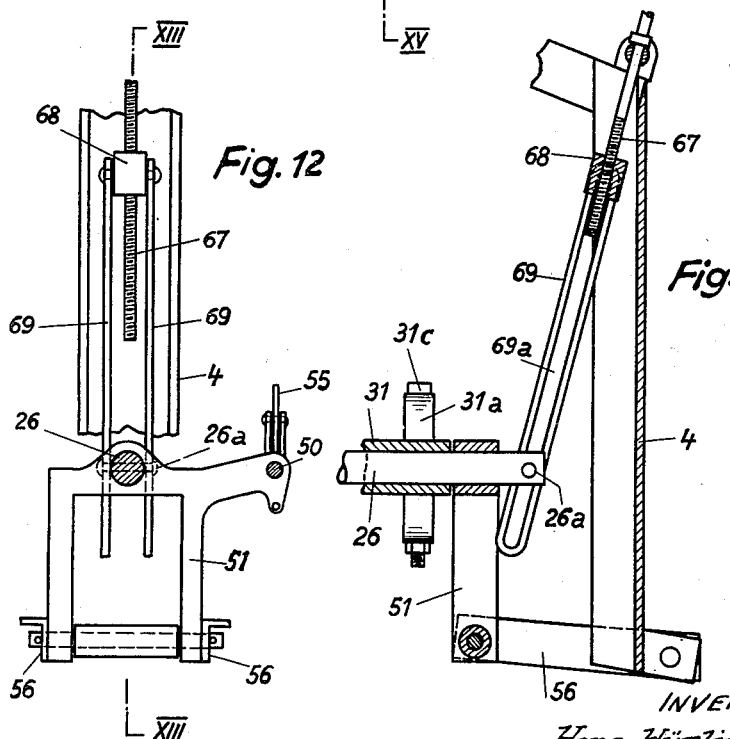
INVENTOR
Hans Hürlimann
by Singer Ehlert Stern & Carlberg
ATTORNEYS.

Patented Oct. 21, 1947

2,429,463

UNITED STATES PATENT OFFICE 2,429,463

TRACTOR DRAWN PLOW

Hans Hürlimann, Wil, Switzerland

Application November 6, 1943, Serial No. 509,200
In Switzerland September 10, 1942

Section 1, Public Law 690, August 8, 1946.
Patent expires September 10, 1962

5 Claims. (Cl. 97—26)

1

The present invention relates to a tractor drawn, turnwrest plow.

The main object of the invention is to provide improved means to lift and to swing the plows at the head-lands.

A further object of my invention consists in the provision of a device to reduce the manual work to be performed by the tractor driver and the time necessary to lift and to swing the plows.

I attain these objects by the provision of means to swing the plows by a motor independent of the drive of the tractor that is without any interruption of the travel of the tractor or of the reversing of the plows.

The invention may be applied to single and to multiple furrow plows.

In the accompanying drawings a preferred embodiment of my invention is shown in a diagrammatical manner:

Fig. 1 is a side elevation of a tractor with a plow attached thereto.

Figs. 4 and 5 are sections taken on the lines IV—IV and V—V respectively of Fig. 2.

Figs. 6, 7 and 8 illustrate in sections on line VI—VI of Fig. 2 different positions of the beam and the means for locking it, in and out of working position, respectively.

Figs. 9 to 11 illustrate in side elevation the different positions of the plow corresponding to the Figs. 6, 7 and 8, respectively.

Fig. 12 is a section on line XII—XII of Fig. 2.

Fig. 13 is a section on line XIII—XIII of Fig. 12.

Fig. 14 shows a modified construction of the turning gear, in side elevation.

Figs. 15 and 16 are cross-sections taken on the line XV—XV of Fig. 14, the beam being shown in different positions, respectively.

Figure 2:
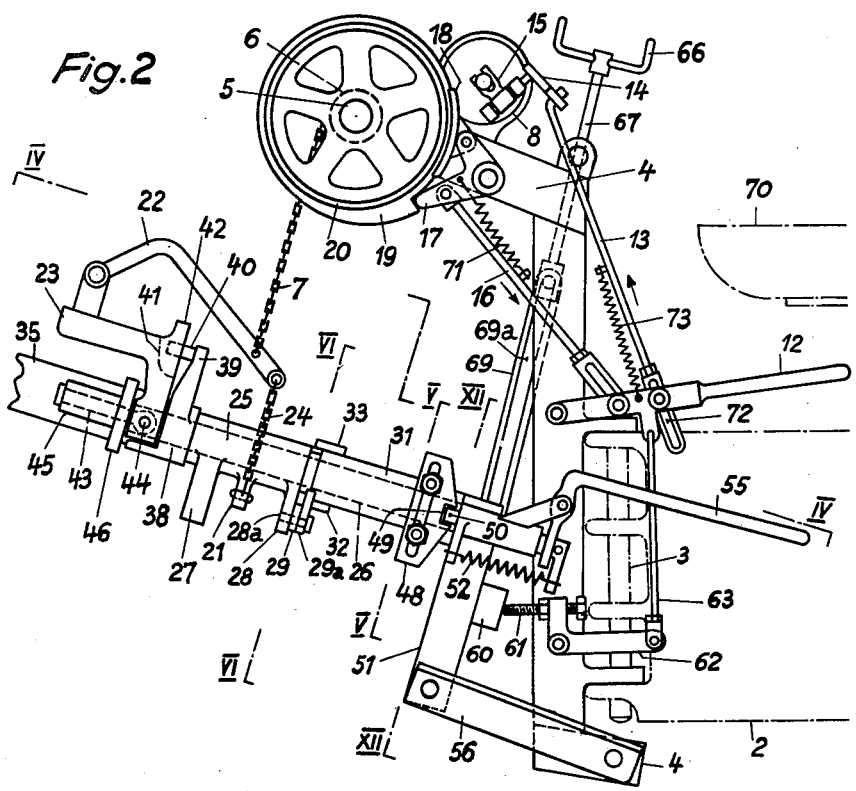
Fig. 2 shows part of the attachment device in side elevation.
Figure 3:
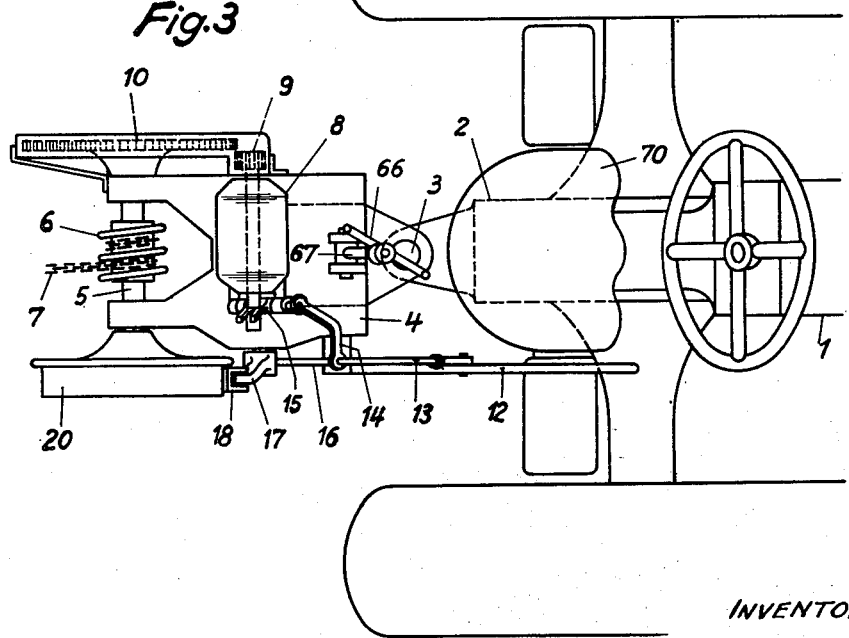
Fig. 3 is a top view of parts shown in Fig. 2.

A tractor 1 has the body 2 to which the frame 4 of a plow is pivotally connected by means of a vertical bolt 3. To the lower end of the frame 4 a support 51 is rockingly connected by two links 56. The support 51 carries a shaft 26 (Figs. 2, 4 to 8). The shaft 26 is provided with a cross pin 26a engaging a slot 69a in each of two rods 69 (Figs. 12, 13) linked to a nut 68 on a screw threaded spindle 67 journalled in the frame 4. By turning a handle 66 (Fig. 2) fixed to spindle 67 the shaft 26 may be raised and lowered and the depth of the furrow determined. On the shaft 26 a sleeve 31 (Figs. 2, 4–8) is rotatably mounted. The sleeve 31 is provided with two arms 31a and 31b. The beam 35 carrying the shares 36 is rock-

2 ingly mounted in the arm 31a of sleeve 31 by means of a bolt 31c (Figs. 4, 5). By turning the sleeve 31 about shaft 26 either set of shares 36 may be brought into operative position. To secure the sleeve 31 and therewith the shares 36 in and out of working position the arms 31a, 31b are each provided with an adjustable plate 48, 48a (Figs. 2, 4) having notches 49, 49a, respectively. A latch 50 slidably mounted in a guide of the frame 4 is held in engagement with the notches by a spring 52. A hand lever 55 (Figs. 2 and 4) pivoted in frame 4 and engaging the said latch 50 ends near the seat 70 within easy reach of the tractor driver. By lifting lever 55 the latch 50 is moved against the action of a spring 52 so that the sleeve 31 and the shares 36 may be turned about shaft 26. Adjacent sleeve 31 a second sleeve 25 is rotatably mounted on the shaft 26. The sleeve 25 is connected by a chain 24 to an auxiliary motor driven device to turn the sleeve 31 and to bring thereby one or the other share 36 into working position. The sleeves 25 and 31 are interconnected by a coupling device 28 to 33 (Figs. 2, 4, 6 to 8). This device comprises two double armed levers 29, 29a pivotally mounted on a pin 28a of an arm 28 of sleeve 25. One arm of each lever 29, 29a is hook-shaped; lever 29 is adapted to grip a stud 32 fixed to sleeve 31 and lever 29a is adapted to grip a stud 33 fixed on sleeve 31. Each lever 29, 29a is provided with a weight 30 which tends to keep the levers 29, 29a in engagement with the respective stud 32, 33. If sleeve 25 is turned 180° in the direction shown by arrow (Fig. 6) the sleeve 31 and therewith the beam 35 and shares 36 will be turned likewise. The lever 29a will engage stud 33 and will return the sleeve 31 and the share 36 to their initial position when the direction of rotation of sleeve 25 is reversed. The sleeve 25 is provided with a heavy arm 27 tending to keep the sleeve 25 in a position in which the lever 29 is in contact with its stud 32. The co-operation of the sleeves 25 and 31 will be described in detail hereinafter.

The beam 35 is furthermore supported between its ends by an arm 46 of a sleeve 45, mounted on a stub shaft 43 pivoted at 44 on shaft 26. An arm 42 is fastened to stub shaft 43 and rests on an extension 38 of an arm 39 rigidly connected to the shaft 26. The arm 39 is provided with a pin 40 engaging a slot 41 of arm 42. The arm 42 is provided with an extension 23 on which a lever 22 is pivoted with one of its ends while the other end is connected by the chain 24 to the sleeve 25. The lever 22 is moreover connected by a chain 7 to the auxiliary lifting device. In the frame 4 a shaft 5 is journalled on which a chain drum 6 and a spur wheel 10 is keyed. The chain 7 is attached to the drum 6 and by means of lever 22 carries the beam 35 and the shaft 26. A spur wheel 10 keyed to shaft 5 may be driven by an electric motor 8 mounted on the frame 4. The motor shaft is axially displaceable and it carries a spur wheel 9 which may be brought in and out of engagement with the spur wheel 10 by shifting the motor shaft in axial direction by means of a hand lever 12. The latter is at one end pivoted in the frame 4; its other end is within easy reach of the driver on the seat 70 of the tractor 1. A bolt fixed to lever 12 engages a slot 72 of a rod 13 the upper end of which actuates the motor switch 15 and shifts the motor shaft by means of a link 14. While the spur wheel 9 is brought into engagement with spur wheel 10 the motor 8 is switched on. A brake drum 20 fastened on shaft 5 cooperates with a brake block 18. Block 18 is pivotally connected with one arm of an angle lever 17 mounted on the frame 4, the other arm engages a cam 19 of the brake drum 20 (Fig. 2). The angle lever 17 is connected with the hand lever 12 by means of a rod 16, a stud of lever 12 engages a slot at the lower end of rod 16.

The hand lever 12 is connected by a link 63 with one arm of an angular lever 62 pivoted to frame 4, the other arm carries a set screw 61 cooperating with an abutment 60 of the support 51 for the shaft 26. On pressing down the hand lever 12 the shaft 26, the beam 35 and the plowshares 36 are lowered towards the ground by their own weight.

Figs. 1, 2 and 9 show the plow in the position for travel on the road. To bring the plow into the position for work shown in Fig. 11 the tractor driver seated at 70 presses the lever 12 downwards. The rod 16 is drawn against the action of a spring 71 in the direction of the arrow Fig. 2 and the angular lever 17 is drawn out of contact with the cam 19. The drum 6 and shaft 5 are free to turn and the plow body falls to the ground under its own weight. The plowshare 36 enters the ground, the depth of the furrow is determined by the position of the levers 69. The shaft 26 and therewith the beam 35 and the share 36 are lowered until the cross pin 26a is arrested by the closed end of the slots in the levers 69. To prevent a rapid fall of the plow body the brake 18, 20 is brought in action by pushing hand lever 12 downwardly with appropriate force.

To lift the share 36 from the ground out of the position shown in Fig. 11 into the position shown in Fig. 9, the hand lever 12 is lifted by the tractor driver. The brake 18, 20 is lifted too, the rod 13 is displaced in the direction of the arrow Fig. 2 against the action of spring 73. By means of link 14 the shaft of the motor is axially displaced bringing its pinion 9 into mesh with the spur wheel 10. Simultaneously the switch 15 is actuated and the motor set in motion. The shaft 5 is turned by motor 8 and drum 6 draws by means of chain 7 the shaft 26 and therewith beam 35 and share 36 from the ground. The support 51 is thereby rocked, and the abutment 60 finally engages the end of the screw spindle 61. The lever 62 is thereby rocked clockwise, Fig. 2, and draws by means of rod 63 the hand lever 12 downwards. The hand lever 12 draws the rod 13 downwardly again, the motor switch 15 is opened and the pinion 9 is brought out of engagement with the spur wheel 10. The plow body released now from the pull of the motor makes a small movement downward until the latch 17 comes in engagement with the cam 19. The plow body is then locked in its raised position Fig. 2.

To swing the plow at the head lands the shaft 26 is brought into the position shown in Fig. 9. The lever 55 is drawn upwardly, the latch 50 is brought out of the notch 49. The sleeve 31 and therewith the beam 35 and the shares 36 are then free to turn about the shaft 26. The sleeves 25 and 31 are in the relative position shown in Fig. 6. Upon release of latch 50 shaft 26 and parts carried thereby fall downwardly and assume the position shown in Fig. 10. As the chain 7 cannot unwind, this movement will induce a rocking movement of lever 22 and a turning movement of sleeve 25. While falling the sleeve 25 had been turned on the shaft 26 from the position shown in Fig. 6 to the position shown in Fig. 7 and has taken with it the sleeve 31 by means of lever 29, 30. The chain 24 pulls the arm 21 of sleeve 25 from downwardly directed position (Fig. 6, Fig. 9) to upward directed position (Fig. 7, Fig. 10) while the shaft 26 is lowered into the position Fig. 10 and the hooked lever 29, 30 draws with it the stud 32 of sleeve 31 from the position of Fig. 6 to the position of Fig. 7. The sleeve 31 turns on the shaft and with it the beam 35 is swung 180° about the shaft 26. The arm 46 connected with the beam 35 also turns about the stub shaft 43, the levers 39 and 42 having sufficient play to allow the turning movement. When the sleeve 31 has performed a rotation of 180° and has attained the position shown in Fig. 10, the latch 50 enters now the notch 49a. The shaft and beam assembly is now locked against rotation and the parts can now be lowered into the position shown in Fig. 11. To lower the parts the hand lever 12 is drawn upwards sufficiently to disengage latch 17 from the cam 19, and the drum 6 is rotated by the action of the lowering body 4. To control the fall the brake shoe 18 is pressed on the drum 20 by lever 12. As soon as the share 36 comes to rest on the ground the chain 24 which had been taut (Fig. 7) becomes loose. The weight 30 moves the hooked arm of lever 29 out of engagement with the stud 32 and the weighted arm 27 turns now the sleeve 25 about the shaft 26. The sleeves 25, 31 assume now the position shown in Fig. 8. The weight 30 of lever 29a brings the latter in engagement with the stud 33 of sleeve 31. The parts remain in this position while a furrow is being ploughed. To swing the plow at the end of a furrow the shaft assembly has again to be lifted into the position shown in Fig. 9 by means of the motor 8, as described above.

The swinging of the plows may be effected without interrupting the travel or the reversing of the tractor at the head lands.

In Figs. 14 to 16 a modified construction of the device to swing the plows is shown.

The lever 122 is pivotally connected to the arm 142 (Fig. 14) and is suspended on the chain 7; the arm 142 is pivoted at 44 to the arm 38. The free end of lever 122 projects in a slot 80 of a plate 81 which is held by two links 82, 83 pivoted at 85, 86 to the sleeve 31. For swinging the plows the latch 50 is withdrawn from the notch 49 so that the sleeve 31 will be turned in the direction of the arrow Fig. 15 by the weight of the beam 35 and of the shares 36. The shaft 26 is lowered as from the position shown in Fig. 9 to the position Fig. 10, while the free end of the lever 122 is kept back by the chain 7. The lever 122 assumes the position shown in Fig. 14 in full lines and supports by the link 83 the shaft 26 and beam 35 which has been swung 180°. The sleeve 31 and the beam 35 are locked by latch 50 which has entered the notch 49a as described above with reference to Figs. 1 to 11. The shaft 26 is now further lowered into the position shown in Fig. 11 by releasing drum 6 and chain 7. As soon as the shares 36 come to rest on the ground the chain 7 becomes loose and the lever 122 drops and its free end enters the recess 88 of the plate 81. After the furrow is finished, the body 4 will be lifted again into the position shown in Fig. 9. By lowering the shaft 26, the plows are released for swinging and the movements are repeated in reversed directions.

What I wish to secure by United States Letters Patent is:

1. A plow of the character described, comprising in combination a frame, a support pivotally attached to said frame, a shaft carried in the support and adjustable in a vertical plane to different elevations in the frame, a sleeve rotatable on the shaft, a tension element connected with said sleeve, a drum on which said tension element is wound, a brake under operator's control in engagement with the drum, means for releasing said brake to permit the tension element to be unwound and to permit said shaft to be lowered, relatively to the frame under its own gravity, motor controlled means in engagement with the drum for raising the shaft to its prior position and for winding the tension element to turn the sleeve about the axis of the shaft, and a plow beam supported by the shaft and rotatable in accordance with the movement of said sleeve relatively to said shaft.

2. In a plow of the character described, the combination of a frame and shaft, pivotally supported in the frame, a sleeve rotatable on the shaft, a plow beam carried by said sleeve, a second sleeve rotatable on the shaft, a tension element attached to said second sleeve and to the frame, operator controlled means for releasing the tension element to permit the assembly of shaft and plow beam to be lowered to the ground, and motor actuated means engaging said tension element for raising the assembly of shaft and plow beam from the ground and for imparting a turning movement to said second sleeve about the axis of the shaft, and means for interconnecting said second and first sleeve, whereby upon rotation of said second sleeve, the plow beam also is turned about the axis of the shaft.

3. In a plow of the character described, the combination of a frame, a shaft pivotally supported in the frame, a sleeve rotatably mounted on the shaft, a plow beam fixedly secured to said sleeve, a second sleeve rotatable about the shaft, a tension element attached to said second sleeve, a drum supported by the frame, and from which said tension element is supported, a brake connected with the drum, a motor, and an operator controlled lever for simultaneously releasing the brake and rendering the motor operative to wind the tension element on the drum and raise the assembly of shaft, sleeves and plow beams, said operator controlled lever being operable to release the brake without starting the motor, whereby said assembly of shaft, plow beam and sleeves is lowered by its own weight relatively to the frame.

4. In a plow of the character described, the combination of a frame, a shaft pivotally supported in the frame, a sleeve rotatably mounted on the shaft, a plow beam fixedly secured to said sleeve, a second sleeve rotatable about the shaft, a tension element attached to said second sleeve, a drum supported by the frame, and from which said tension element is supported, a brake connected with the drum, a motor, an operator controlled lever for simultaneously releasing the brake and rendering the motor operative to wind the tension element on the drum and raise the assembly of shaft, sleeves and plow beams, said operator controlled lever being operable to release the brake without starting the motor, whereby said assembly of shaft, plow beam and sleeves is lowered by its own weight relatively to the frame, and means for regulating the extent of lowering the assembly of shaft and plow beam operable independently of the gravity effected lowering movement of said assembly under control of the tension element and drum.

5. In a plow of the character described, the combination of a frame, a shaft rockably supported on said frame, a sleeve rotatable about the shaft, a plow beam carried by said sleeve, a second sleeve rotatable about the shaft and adapted for coupling movement with said first named sleeve, a tension element attached at one end to said second sleeve, a drum supported by said frame and on which the tension element is wound, a brake for said drum normally applied thereto to maintain said tension element under tension, an electric motor, a hand operated lever connected with said brake and said motor, and adapted upon movement in one direction to release the brake and to start the motor for winding the tension element on the drum, and means operable upon assumption of a predetermined angular position of the shaft relatively to the frame for restoring said hand operated lever to inoperative position.

HANS HÜRLIMANN.

REFERENCES CITED

The following references are of record in the file of this patent:

UNITED STATES PATENTS

| Number | Name | Date |
|---|---|---|
| 1,358,158 | Karn | Nov. 9, 1920 |
| 1,191,143 | Amiot | July 18, 1916 |
| 2,227,366 | Pridgen | Dec. 31, 1940 |

FOREIGN PATENTS

| Number | Country | Date |
|---|---|---|
| 173,624 | Switzerland | Feb. 16, 1935 |
| 240,945 | Switzerland | June 17, 1946 |
| 437,135 | Germany | Nov. 15, 1926 |